United States Patent [19]

Woods

[11] Patent Number: 4,757,901

[45] Date of Patent: Jul. 19, 1988

[54] ERASABLE LABEL KIT

[76] Inventor: Stephen G. Woods, 5 Liszt St., Hicksville, N.Y. 11801

[21] Appl. No.: 17,823

[22] Filed: Feb. 24, 1987

[51] Int. Cl.⁴ .................... B65D 85/00; B65D 85/28
[52] U.S. Cl. ............................... 206/575; 15/242; 40/638; 206/214; 206/232; 206/387; 206/459
[58] Field of Search ............... 206/444, 459, 232, 411, 206/214, 813, 387, 575, 820; 40/611, 5, 2 R, 360; 15/424, 435; 401/37, 52, 195

[56] References Cited

U.S. PATENT DOCUMENTS

| | | | |
|---|---|---|---|
| 2,107,194 | 2/1938 | Yacker et al. | 206/214 |
| 2,845,728 | 8/1958 | Huber | 206/820 |
| 2,914,166 | 11/1959 | Bihler | 206/820 |
| 4,271,961 | 6/1981 | Blankenmeister | 206/387 |
| 4,317,852 | 3/1982 | Ogden | 206/820 |
| 4,432,827 | 2/1984 | Graetz et al. | 206/387 |
| 4,501,396 | 2/1985 | Tomsyck et al. | 40/611 |
| 4,570,797 | 2/1986 | Weinman | 206/472 |
| 4,591,056 | 5/1986 | Groch | 206/214 |
| 4,609,231 | 9/1986 | Neuman | 206/387 |
| 4,618,061 | 10/1986 | Rubenfeld | 206/444 |

FOREIGN PATENT DOCUMENTS 8202868 9/1982 PCT Int'l Appl. ............. 206/387

Primary Examiner—Jimmy G. Foster
Attorney, Agent, or Firm—Michael I. Kroll

[57] ABSTRACT

An erasable label kit for a video cassette, a computer floppy disk and the like is provided and consists of a plurality of durable permanent reusable self adhesive polyester film labels each of which is placed onto one video cassette or computer floppy disk, a dry-erase marker pen for placing indicia on each of the labels, an eraser having polyester pile fabric for easily removing the indicia and a container for holding the labels, pen and eraser. The container is shaped similar to the video cassette so that it can be stored alongside other cassettes to be easily accessible.

4 Claims, 1 Drawing Sheet

ERASABLE LABEL KIT

BACKGROUND OF THE INVENTION

1. Field of the Invention

The instant invention relates generally to labels and more specifically it relates to an erasable label kit for a video cassette, a computer floppy disk and the like.

2. Description of the Prior Art

Video cassettes and computer floppy disks are used over and over to record various programs, and as such, a changeable labelling system is very important so that programs recorded can be identified. At the present time adhesive paper strips are secured to the cassette and disk in which the location and identification of the program is written on the strip so that the contents can be readily identified. When the tape and disk is erased and another program recorded the original indicia must be crossed out, erased or another paper strip applied thereto.

SUMMARY OF THE INVENTION

A primary object of the present invention is to provide an erasable label kit for a video cassette, a computer floppy disk and the like that will overcome the shortcomings of the prior art devices.

Another object is to provide an erasable label kit that includes durable permanent reusable self adhesive labels, a dry-erase marker pen and an eraser whereby the labels will not wipe off readily with ordinary handling but will wipe off easily with the eraser.

An additional object is to provide an erasable label kit that includes a container for holding the labels, pen and eraser similar in shape to a video cassette so that it can be stored alongside other cassettes to be easily accessible.

A further object is to provide an erasable label kit that is simple and easy to use.

A still further object is to provide an erasable label kit that is economical in cost to manufacture.

Further objects of the invention will appear as the description proceeds.

To the accomplishment of the above and related objects this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
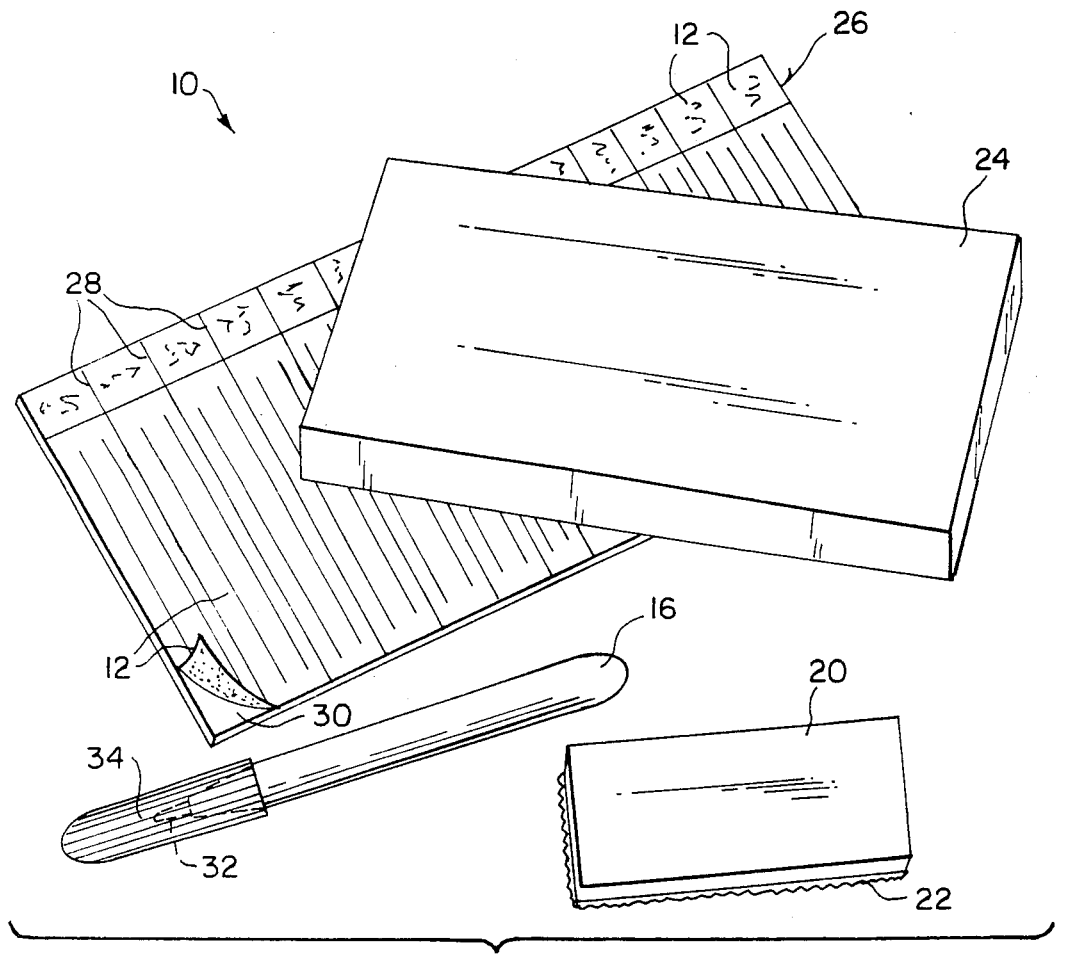
FIG. 1 is a perspective view of the invention showing various components thereof.
Figure 2:
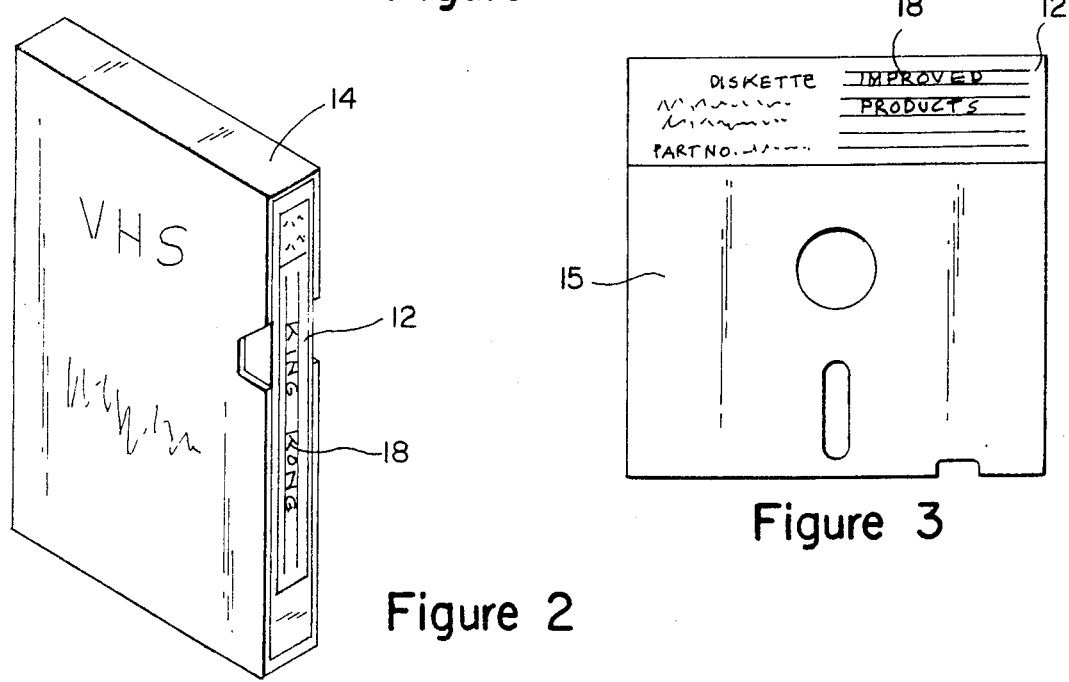
FIG. 2 is a perspective view of a video cassette with a label from the invention placed thereon and indicia written with dry-erase marker pen.
Figure 3:
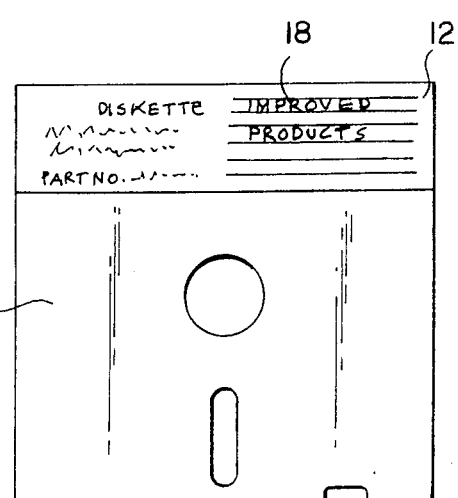
FIG. 3 is an elevational view of a computer floppy disk with a label from the invention placed thereon and indicia written with dry-erase marker pen.

Turning now descriptively to the drawings, in which similar reference characters denote similar elements throughout the several views, FIG. 1 illustrates an erasable label kit 10 for a video cassette, a computer floppy disk and the like that consists of a plurality of durable permanent reusable self-adhesive polyester film labels 12, each of which is placed onto one video cassette 14 (see FIG. 2) or computer floppy disk 15 (see FIG. 3). A dry-erase marker pen 16 is for placing indicia 18 (see FIGS. 2 and 3) on each of the labels 12. An eraser 20 has polyester pile fabric 22 for easily removing the indicia 18 from each of the labels 12. A container 24 is provided for holding the labels 12, the pen 16 and the eraser 20.

The labels 12 are formed in a sheet 26 having perforated cut lines 28 therebetween with a disposable backing 30 so that each label 12 can be individually peeled off the backing 30 to be placed onto one video cassette 14 or computer floppy disk 15.

The container 24 is shaped similar to the video cassette 14 so that it can be stored alongside other video cassettes to be easily accessible thereto.

The dry-erase marker pen includes a standard shaped fine felt tip point 32 and a plastic cap 34 to cover the point 32 when not being used.

The erasable label kit 10 can also be modified so as to be used on audio cassettes, answering machine tapes, dictaphone tapes, micro-cassettes, 8 mm video cassettes, standard office file folders, tape reels and any item that is labeled where that label is changed at some later date to reflect a change in the contents of that item.

The label 12 being from a sheet of no-top coated polyester film prevents dry-erase marker ink from biting into the film and becoming indelible so that the ink can be removed easily from the sheet. This particular film material and ink in combination is highly resistant to accidental erasure, specifically in normal handling. Other write on/wipe off material will either allow very easy erasure and smudge if touched or the ink will be permanently placed thereon.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An erasable label kit for video cassette, a computer floppy disk and the like, comprising in combination:
   (a) a plurality of durable reusable self adhesive labels having a non-top coated, non-release coated polyester film so that indicia is not etched into it and made indelible, each of which is placed onto one video cassette and computer floppy disk;
   (b) a dry-erase marker pen for placing indicia on each of the labels so that the indicia is not undesirably erased, smudged or smeared during normal handling;
   (c) an eraser having polyester pile fabric so that the indicia is easily removed from each of said labels only when desired; and
   (d) a container for holding said labels, said pen and said eraser.

2. An erasable label kit as recited in claim 1, wherein said labels are formed in a sheet having perforated cut lines therebetween with a disposable backing so that each said label can be individually peeled off said backing to be placed onto one video cassette and computer floppy disk.

3. An erasable label kit as recited in claim 2, wherein said container is shaped similar to the video cassette so that it can be stored along side other video cassettes to be easily accessible thereto.

4. An erasable label kit as recited in claim 3, wherein said dry-erase marker pen includes a standard shaped fine felt tip point and plastic cap to cover said point when not being used.

* * * * *